(No Model.) 2 Sheets—Sheet 2.
R. THURY.
DYNAMO ELECTRIC MACHINE.
No. 465,808. Patented Dec. 22, 1891.
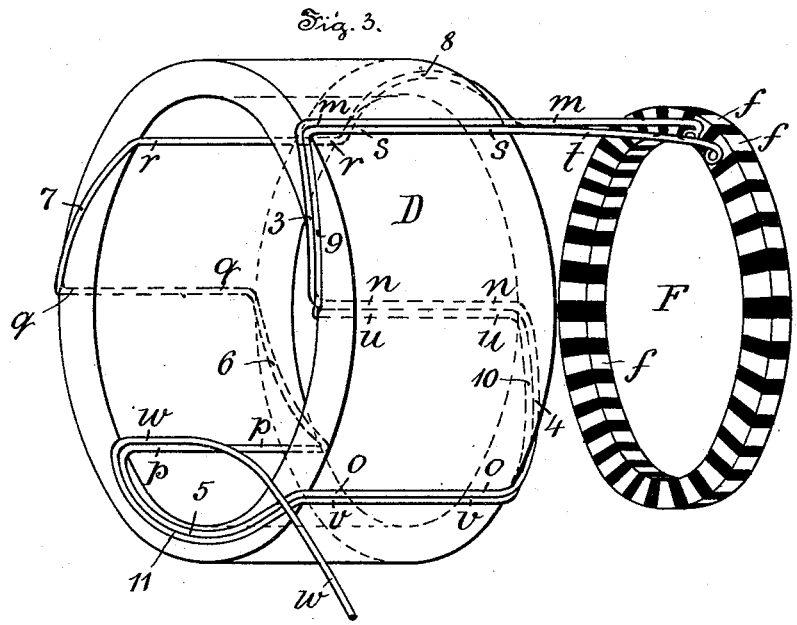
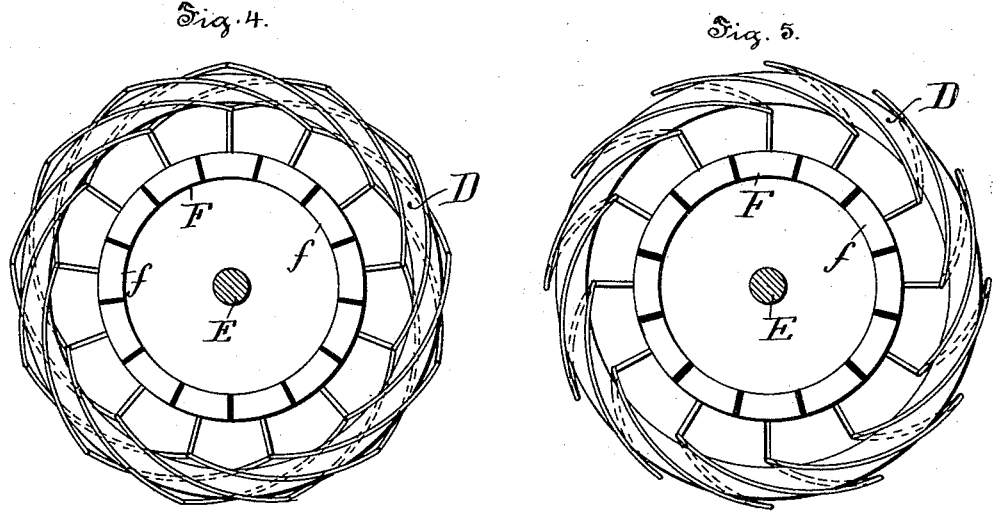
Witnesses:
Hermann Bormann
Thomas M. Smith
Inventor:
R. Thury
by J. Walter Douglass
att'y

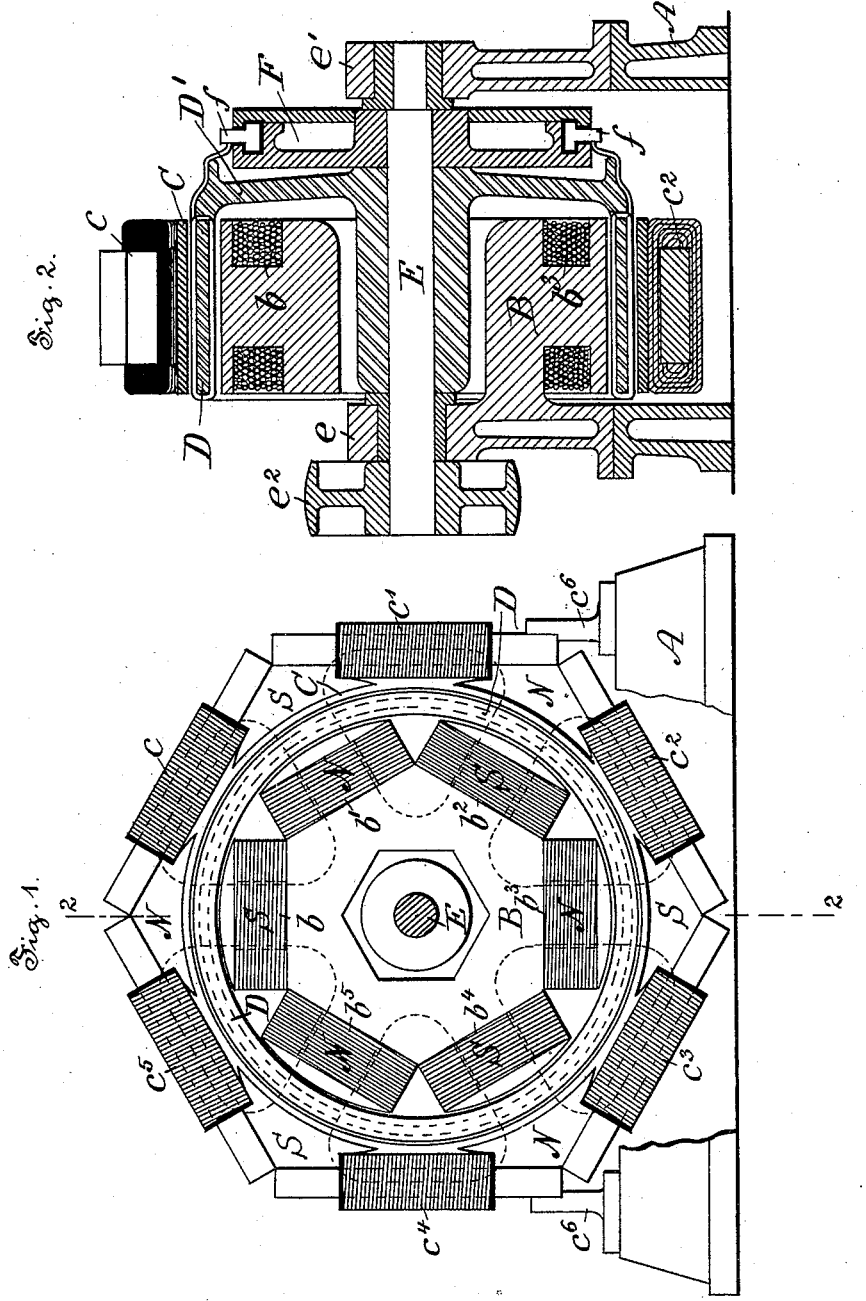

UNITED STATES PATENT OFFICE.

RENÉ THURY, OF GENEVA, SWITZERLAND.

DYNAMO-ELECTRIC MACHINE.

SPECIFICATION forming part of Letters Patent No. 465,808, dated December 22, 1891.

Application filed August 4, 1891. Serial No. 401,707. (No model.) Patented in Switzerland December 31, 1890, No. 3,035.

*To all whom it may concern:*

Be it known that I, RENÉ THURY, a citizen of Switzerland, residing at Geneva, Switzerland, have invented certain new and useful Improvements in Dynamo-Electric Machines, (for which I have obtained Swiss Letters Patent No. 3,035, dated December 31, 1890;) and I do hereby declare the following to be a full, clear, and exact description of the invention, such as will enable others skilled in the art to which it appertains to make and use the same, reference being had to the accompanying drawings, and to letters and figures of reference marked thereon, which form a part of this specification.

It is well known that many inconveniences and disadvantages are encountered in the employment of dynamo-electric machines or generators having armatures provided with magnatic cores, and such inconveniences and disadvantages arise largely, if not entirely, from the wasteful expenditure of force or energy in the magnetization and demagnetization of the magnetic masses, which results from the lagging of one of these two related magnetic phenomena behind the other or "hysteresis," as it is sometimes called. Moreover, this loss of energy increases when powerful fields and high speeds of rotation are employed, so that in some instances the loss or waste of energy becomes so excessive that the heating resulting from it interferes with the safe operation of the machine even when the latter is not employed for supplying useful currents. Consequently efforts have been made to avoid the use of iron in the construction of the armatures of dynamo-electric machines. For example, radial armatures have been employed, and also armatures provided with a drum-like winding and adapted to be revolved between two stationary field-pieces. However, these armatures possess all the inconveniences of a weak and complicated mechanical construction, and therefore are more or less defective in operation. Moreover, the drum-armatures are exceedingly difficult to wind, and therefore their cost is excessive. Besides all armatures of the types recited present a very serious practical inconvenience, because in them the neighboring sections of the winding have between them the total differences of tension furnished by the machine, so that the difficulties of insulation and as well as the interior and interspace resistance are increased. Moreover, in order to attain the requisite strength the coils of such armatures must be composed of large stiff conductors, which, as is well known, give rise to Foucault currents, thereby seriously diminishing the efficiency of the machine. I have found that excellent results may be obtained by employing just as little iron in the armature as is required to afford sufficient rigidity or strength of construction, and by disposing this iron in such manner that its presence does not create any appreciable magnetic resistance, so that the coils supported by the iron of the armature may be composed of very fine wires, whereby Foucault currents are avoided. Moreover, in an armature embodying features of my invention the sections of winding follow each other regularly, and therefore do not present the inconveniences of ordinary drum-winding—that is to say, the presence of neighboring conductors between which there exists all the difference of tension available at the terminals of the machine.

The principal objects of my present invention are, first, to avoid the inconveniences and disadvantages heretofore encountered in the employment of armatures with magnetic cores, and, second, to provide a comparatively inexpensive, durable, and efficient multipolar dynamo-electric machine.

My invention consists of a multipolar dynamo-electric machine or generator comprising two concentric rows of field-magnets having the unlike poles of the magnets of the respective series in juxtaposition, a rotatable armature composed of a divided hollow thin iron cylinder mounted between said rows of magnets and covered on the inner face with internal conductors and on the outer face with external conductors, and connections at the respective bases of the armature for coupling up said conductors from pole to pole and in series.

My invention further consists in the improvements hereinafter fully described, and pointed out in the claims.

The nature and characteristic features of my present invention will be more fully understood from the following description, taken in connection with the accompanying drawings, forming part hereof, and in which—

Figure 1 is a side elevation, partly in section, of a multipolar dynamo-electric machine or generator embodying features of my invention and provided with six poles. Fig. 2 is a transverse section on the line 2 2 of Fig. 1. Fig. 3 is a perspective view, on an enlarged scale, of the armature of the machine, showing one complete section of winding and the commencement of another section of winding, and also showing the connections at the bases of the armature for coupling the conductors together and to the segments of the commutator. Fig. 4 is an end view of the commutator and armature of a machine having six poles, showing the winding in thirteen sections arranged for tension—i. e., in series; and Fig. 5 is a view similar to Fig. 4, showing an armature-winding in twelve sections arranged for quantity—i. e., in parallel.

In the drawings, A is the base-plate or main frame of the machine.

B is a recessed ring supported by the base-plate or main frame A, as shown at the left-hand side of Fig. 2, and having any even number of electro-magnets—for example, six—designated, respectively, in Fig. 1 by the reference-letters $b$, $b'$, $b^2$, $b^3$, $b^4$, and $b^5$ applied to the recesses thereof.

C is a ring of larger diameter than the ring B and disposed concentrically therewith. This ring C is provided with a series of magnets corresponding in number with the series of magnets supported by the ring B, and designated in Fig. 1 by the reference-letters $c$, $c'$, $c^2$, $c^3$, $c^4$, and $c^5$.

$c^6$ are pillars connected with the base-plate or main frame A and adapted to support the ring B.

D is an armature composed of a divided hollow cylinder of thin iron, the internal and external faces of which are covered, respectively, with internal and external straight conductors arranged parallel to the axis of the armature and coupled together in a manner to be presently described. This armature D is attached at one of its bases to a solid disk D', of bronze or other non-magnetic or slightly magnetic metal, keyed or otherwise attached to the axis or shaft E, care being exercised to make the connections between the armature D and disk D' in such manner that the armature may be shifted past the disk, and thus removed from or applied to the machine without removing the disk D'.

$e$ and $e'$ are bearings for supporting the axis or shaft E, and $e^2$ is a pulley by means of which the latter may be rotated.

F is a commutator keyed or otherwise attached to the shaft E and provided with conducting-segments $f$.

The electro-magnets comprising the two concentric rows of field-magnets are arranged in such manner that unlike poles designated, respectively, by the letters N and S in Fig. 1 are in juxtaposition, so that six magnetic circuits are formed, which are indicated by dotted lines in Fig. 1, and each of these circuits twice traverses radially the thickness of the armature, thus the magnetic influence created by the exterior series of magnets $c$, $c'$, $c^2$, $c^3$, $c^4$, and $c^5$ tends to produce a current moving through the coils of the armature in the same direction as the current produced by the magnetic influence of the interior series of magnets $b$, $b'$, $b^2$, $b^3$, $b^4$, and $b^5$.

Referring now to Fig. 3 for a description of an armature-winding embodying features of my invention and arranged in tension—that is, in series—$m$ is an exterior conductor, connected at one extremity with one of the segments $f$ of the commutator F and disposed parallel with the axis of the armature. The other extremity of this conductor $m$ is connected by a connection 3 with an interior conductor $n$, disposed parallel with the conductor $m$ and about sixty degrees in advance thereof, so as to occupy a position opposite the next pole of the field-magnets—i. e., if the conductor $m$ is opposite the pole of the magnets $b$, $c^5$, and $c$ then the conductor $n$ is opposite the pole of the magnets $c$, $b'$, and $c'$, Fig. 1. The interior conductor $n$ is connected by a connection 4 with the external conductor $o$, placed sixty degress in advance of the conductor $n$. Then in order the conductor $o$ is connected with the conductors $p$, $q$, and $r$ by connections 5 6 7, and the connection 8 is connected with one of the segments $f$ of the commutator by a branch $t$. $s$ is the commencement of the following section of the winding, and the same arrangement of conductors and connections is repeated as many times as there are sections of winding in the armature. When the armature is at work, there exists between the neighboring conductors $m$ and $s$ a difference of electro-motive force equal to the sum of the electro-motive forces developed in the conductors $m$, $n$, $o$, $p$, $q$, $r$, and $s$—that is to say, in one complete section of winding—and the above statement is true for each of the sections of the winding. Of course the conductors and connections are composed of a continuous wire or series of wires and may be as fine or small as required.

Fig. 4 shows the disposition of the connections upon the respective bases of an armature arranged for a six-pole dynamo-machine. The connections on the rear of the armature are shown in dotted lines, and the connections and branches to the segments $f$ of the commutator on the front of the armature are shown in full lines. From an inspection of the figure it will appear that the sections of winding are thirteen in number, and are arranged in tension—i. e., in series.

Fig. 5 represents in a similar manner twelve sections of winding arranged for quantity—i. e., in parallel. An inspection of said figure will show that the series of interior conductors after leaving the corresponding segments of the commutator-cylinder traverse the armature in a direction parallel to the axis thereof and are united at the front of the armature by connections with a series of exterior conductors placed about sixty degrees in advance of the interior conductors, and it will also appear that the exterior conductors are united at the back of the armature by means of connections with a succeeding series of interior conductors placed about thirty degrees in rear of the last-mentioned series of exterior conductors.

Having thus described the nature and objects of my present invention, what I claim as new, and desire to secure by Letters Patent, is—

1. A multipolar dynamo-electric machine or generator comprising two concentric rows of field-magnets disposed the one within the other and having the unlike poles of the magnets of the respective rows in juxtaposition, a rotatable armature composed of a divided hollow thin iron cylinder mounted between said rows of magnets and provided on the inner face with internal axially-disposed conductors and on the outer face with external axially-disposed conductors, and connections at the respective bases of the armature for coupling up said conductors from pole to pole, substantially as and for the purposes set forth.

2. In a multipolar dynamo-electric machine or generator, an armature composed of a divided hollow thin iron cylinder and provided on the inner face with internal axially-disposed conductors and on the outer face with external axially-disposed conductors and having connections at the respective bases of the armature for coupling up said conductors from pole to pole, substantially as and for the purposes set forth.

3. In combination, a base-plate, two concentric rings whereof the inner one is connected at one edge to said plate and is recessed, and the other is supported by pillars, electro-magnet coils applied to the recesses of the inner ring, magnets supported by said outer ring, a hollow cylindrical armature adapted to revolve between said rings, an axis supported by said base-plate, a non-magnetic plate connecting said armature and axis, a commutator-cylinder connected with said axis, and means for rotating the axis, substantially as and for the purposes set forth.

In testimony whereof I affix my signature in presence of two witnesses.

RENÉ THURY.

Witnesses:
ERNEST SAUTTER,
G. PRENTICE NAYLOR.